United States Patent [19]
Ohnsorge et al.

[11] Patent Number: 5,337,175
[45] Date of Patent: Aug. 9, 1994

[54] OPTICAL COMMUNICATIONS SYSTEM FOR THE SUBSCRIBER AREA WITH OPTICAL AMPLIFIERS

[75] Inventors: Horst Ohnsorge, Freiberg; Adolf Weygang, Stuttgart; Rolf Heidemann, Tamm, all of Fed. Rep. of Germany

[73] Assignee: Alcatel N.V., Amsterdam

[21] Appl. No.: 833,935

[22] Filed: Feb. 11, 1992

[30] Foreign Application Priority Data

Feb. 11, 1991 [DE] Fed. Rep. of Germany ....... 4104084
May 22, 1991 [DE] Fed. Rep. of Germany ....... 4116660

[51] Int. Cl.$^5$ .................... H04J 14/00; H04B 10/00; H04B 10/02
[52] U.S. Cl. .................... 359/125; 359/115; 359/152; 359/178; 359/179; 359/120; 359/121
[58] Field of Search ............ 359/113, 114, 115, 118, 359/119, 120, 121, 123, 124, 125, 152, 173, 174, 175, 176, 177, 178, 179, 341, 345; 379/53, 54; 358/85, 86

[56] References Cited

U.S. PATENT DOCUMENTS

| | | | |
|---|---|---|---|
| 4,441,180 | 4/1984 | Schüssler | 359/114 |
| 4,506,356 | 3/1985 | Krull | 359/118 |
| 4,525,834 | 6/1985 | Schenkel et al. | 359/125 |
| 4,545,048 | 10/1985 | Hauk et al. | 359/114 |
| 4,567,586 | 1/1986 | Koeck | 359/118 |
| 4,641,375 | 2/1987 | Dean | 359/152 |
| 4,705,350 | 11/1987 | Cheng | 359/123 |
| 4,726,010 | 2/1988 | Ali et al. | 359/125 |
| 4,809,362 | 2/1989 | Claus et al. | 359/120 |
| 4,873,681 | 10/1989 | Arthurs et al. | 359/123 |
| 4,891,694 | 1/1990 | Way | 359/114 |
| 4,975,513 | 11/1990 | Mochizuki et al. | 359/114 |
| 5,083,874 | 1/1992 | Aida et al. | 359/174 |
| 5,107,361 | 4/1992 | Kneidinger et al. | 359/135 |
| 5,202,780 | 4/1993 | Fussganger | 359/125 |
| 5,202,780 | 4/1993 | Fussgänger | 359/125 |
| 5,212,577 | 5/1993 | Nakamura et al. | 359/124 |

FOREIGN PATENT DOCUMENTS

| | | | |
|---|---|---|---|
| 0386482 | 9/1990 | European Pat. Off. | 359/125 |
| 0112830 | 5/1989 | Japan | 359/113 |

OTHER PUBLICATIONS

Nr. 3, Jan. 25, 1991, Muuchen DE 'Seiten 59–62 Miki, "Fibre to the Home": Strategien in Japan'. Funkschau Mar. 1991.

IEEE Global Telecommunications Conference, Nov. 2989, Dallas, US, Seiten 1671–1674 Rosher et al "A new approach to the provision of POTS and CATV over passive optical networks".

Electronics Letters. Bd. 27, Nr. 1, Jan. 3, 1991, Stevanage GB Seiten 89–91 Suyama et al "Bidirectional transmission scheme using intensity modulation of 1.48 um pump laser diode for erbium-doped fibre amplifier".

IEEE Technical Digest on Optical Amplifiers and Their Applications, Aug. 1990, Montery, US Seiten 232–235 Kikushima et al "Simultaneous distribution of AM/FM FDM TV signals to 65536 subscribers using 4 stage cascase EDFAs".

Primary Examiner—Richard E. Chilcot, Jr.
Assistant Examiner—R. Bacares

[57] ABSTRACT

Optical communications system for the subscriber area with optical amplifiers.

The system according to the invention is used to distribute information signals, particularly telephone signals, from a center to a plurality of subscribers and to make possible a bidirectional transmission of telephone and data signals between the center and the subscribers. According to the invention, the network used for this purpose is a multistar fiber-optic network in which fiber-optic amplifiers (10, 11) are present between successive branch points. The information signals to be distributed are transmitted via the fiber-optic network with a first wavelength ($\lambda_1$) to the subscribers, and the subscriber-specific information signals to be transmitted from the center (1) to the subscribers ($T_i$) are converted by frequency modulation to a different frequency band ($FB_2$) than the distribution signals (by frequency modulation) and transmitted to the subscribers at the same wavelength as the distribution signals, and the subscriber-specific signals to be transmitted from the subscribers ($T_i$) to the center (1) are converted by frequency modulation to another frequency band ($FB_3$) and are transmitted optically to the center with a second wavelength ($\lambda_2$). This optical signal is amplified at suitable points (A) and several alternative embodiments for this amplification are indicated.

20 Claims, 4 Drawing Sheets

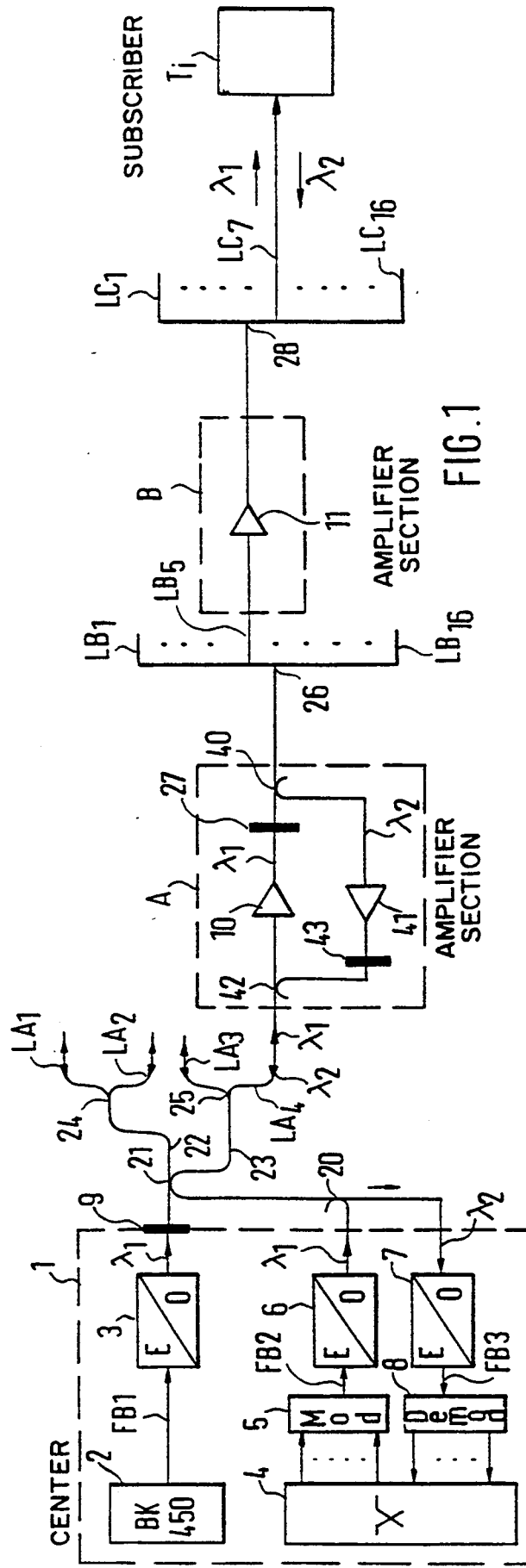
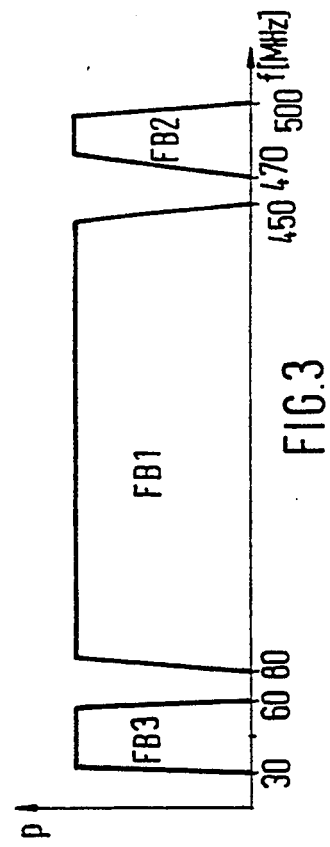
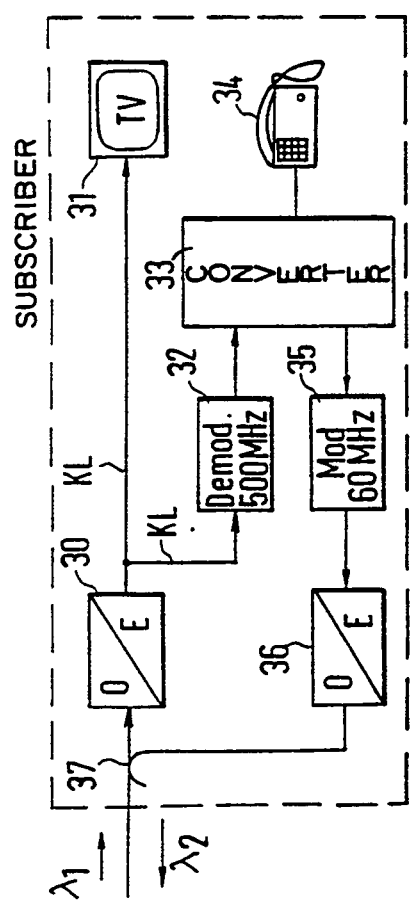

OPTICAL COMMUNICATIONS SYSTEM FOR THE SUBSCRIBER AREA WITH OPTICAL AMPLIFIERS

TECHNICAL FIELD

The invention relates to an optical communications system.

BACKGROUND OF THE INVENTION

A system of this type is known from IEEE Technical Digest on Optical Amplifiers and their Applications, Monterey, August 1990, pp 232–235 (WB1). The system described there is a pure distribution system for television signals. A large number of subscribers is connected by means of a multistar fiber-optic network to a television center. Fiber-optic amplifiers are present between successive branch points of the fiber-optic network, each of which consists of an erbium-doped length of fiber and a pump source. A frequency band containing the television signals to be transmitted is converted into an optical signal with a wavelength of 1552 nm, and the optical system is transmitted via the fiber-optic network to the subscribers, where it is amplified in the fiber-optic amplifiers.

In many applications, there is the additional requirement for the transmission, in addition to the television signals, of signals of bidirectional services (dialog services), such as, e.g., telephone and data transmission services, between the center and the subscribers and vice versa.

An optical communications system that can transmit not only television signals but also signals of bidirectional services between a center and subscribers is known from German patent application DE-A1 39 07 495. In this, the center is connected by means of an optical waveguide with a front-end device containing a star coupler, from which subscriber-assigned optical waveguides lead to a group of subscribers. These signals to be transmitted from the center to the subscribers are converted as a frequency band into an optical signal with a first wavelength, and this optical signal is transmitted to the subscribers. The signals to be transmitted from the subscribers to the center are converted into signals with subscriber-assigned frequencies, and these are transmitted as optical signals with a second wavelength via the star coupler to the center. The number of subscribers that can be serviced with an optical transmission system of this type is limited to a relatively small number in such a system even if, as is mentioned there, optical amplifiers are present in the star couplers.

It is therefore the task of the invention to indicate an optical communications system of the type mentioned above that is suitable for a larger number of subscribers.

SUMMARY OF THE INVENTION

According to the invention, a fiber-optic communications system is provided with a center (1) and a plurality of subscribers ($T_i$) wherein the subscribers are connected to the center (1) via a multistat fiber-optic network ($LA_i$, $LB_i$, $LC_i$). Fiber-optic amplifiers (10, 11) are provided between successive branch points of the fiber-optic network. Information signals, particularly television signals distributed by the center (1) to the subscribers ($T_i$), after being converted to a first frequency band (FB1), are transmitted as an optical signal having a first wavelength ($\lambda_1$) over the fiber-optic network to the subscribers ($T_i$), with the optical signal being amplified by the fiber-optic amplifiers (10, 11). The improvement comprises means provided for transmitting subscriber-assigned information signals, particularly telephone signals, converted to a second frequency band (FB2) with subscriber-assigned frequencies, as an optical signal having the first wavelength ($\lambda_1$) from the center to the subscribers, with the optical signal being amplified in the fiber-optic amplifiers (10, 11). Means are also provided for transmitting subscriber-assigned information signals, particularly telephone signals, converted to a third frequency band (FB3) with subscriber-assigned frequencies, as an optical signal having a second wavelength ($\lambda_2$) from the subscribers over the same fiber-optic network to the center without the optical signal with the second wavelength being amplified in the fiber-optic amplifiers. Furthermore, at points (A) of the fiber-optic network where amplification of the optical signal to be transmitted to the center and having the second wavelength ($\lambda_2$) is necessary, means (40, 41, 43, 51, 54, 52) are provided for extracting the optical signal from the optical waveguide ($LA_4$), amplifying it, and reinjecting it into the optical waveguide ($LA_4$).

DESCRIPTION OF THE DRAWING

The invention will now be explained in greater detail with reference to the drawings, in which:

FIG. 1 shows the basic structure of the system according to the invention.

FIG. 2 shows the devices present at a subscriber of the system according to FIG. 1 in the form a block diagram.

FIG. 3 shows a first frequency plan for the frequencies of the signals used for signal transmission according to the system of the invention.

BEST MODE FOR CARRYING OUT THE INVENTION

Figure 4:
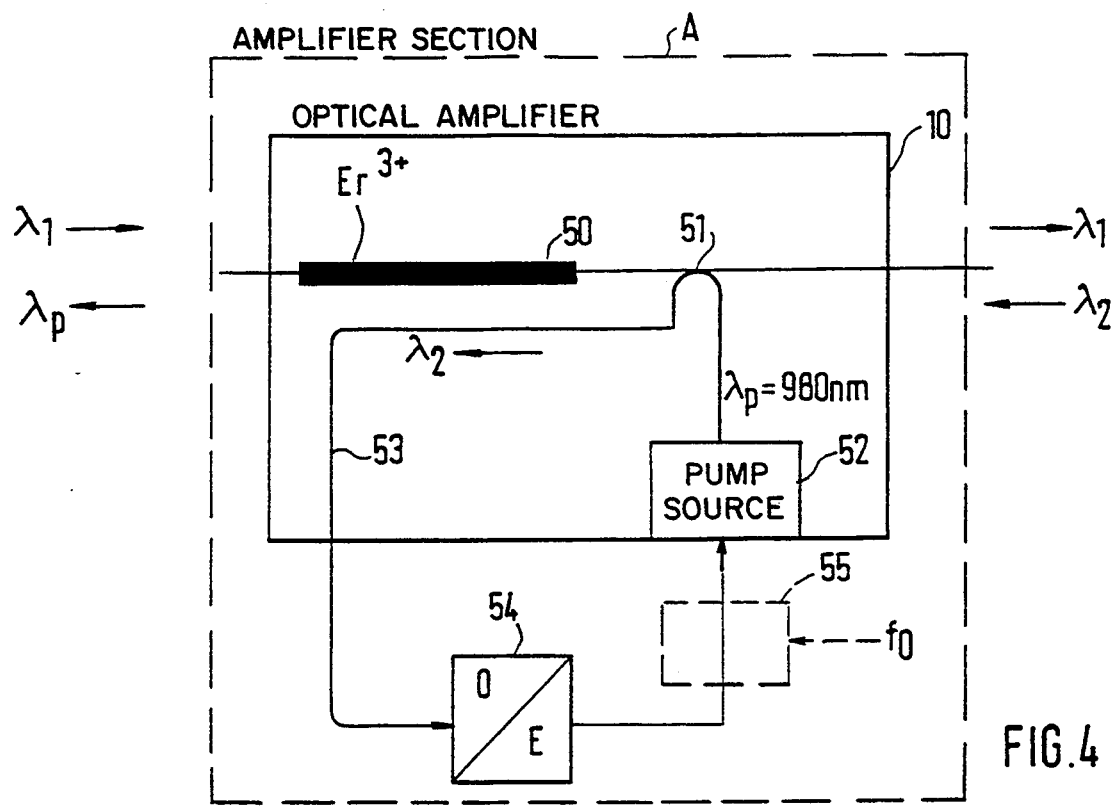
FIG. 4 shows a second embodiment of the amplifier section A of FIG. 1.

In FIG. 1, the whole center is shown in the left-hand part and is designated by the reference number 1. It contains a so-called cable television head station, which is designated by the reference number 2. The cable television head station 2, at its output, delivers a frequency-division multiplex signal with a bandwidth of 80–450 MHz, i.e., a frequency band for television and radio transmission similar to the coaxial cable television system BK 450 of the German Federal Post Office. However, this frequency-division multiplex signal is not distributed to the subscribers in the usual manner, via coaxial lines, but via the optical communications system according to the invention. In the frequency plan of FIG. 3, the frequency band occupied by the cable television frequency-division multiplex signal is designated by FB1, and the line continuing from the output of the cable television head-station 2, which is a coaxial line, is therefore also designated as FB1 in FIG. 1.

The line feeds the above-mentioned cable television frequency-division multiplex signal into an electric-to-optical transducer 3, which converts it to an optical signal, by using it for intensity modulation of its output light with a wavelength of $\lambda_1$, preferably of 1550 nm. In the path of the optical signal there is an optical isolator 9 to protect the transducer 3 against reflections of the optical signal to be transmitted in a downward direction from any transmission devices, e.g., in the fiber-optic amplifier 10.

The optical output signal of the transducer 3, similarly to the case of the distribution system mentioned above, is transmitted by means of the fiber-optic network (to be described later) to a large number of subscribers, of which a single one is shown as a representative and is designated by $T_i$, and, in this process, is amplified by means of fiber-optic amplifiers 10 and 11, which are located between successive branch points of the fiber-optic network.

The subscriber-assigned information signals to be transmitted from the center 1 to the subscribers originate from a local switching center 4 located in the center, to which the subscribers in question are connected by means of the fiber-optic network. In the embodiment shown, the number of subscribers connected to a local switching center is 1024. The local switching center 4 feeds the subscriber-assigned signals to be transmitted to these subscribers via 1024 parallel output lines into a modulation device 5, which converts the large number of signals into a frequency-division multiplex signal with subscriber-assigned frequencies, which, in the frequency plan according to FIG. 3, occupies a frequency band FB2, ranging from approximately 470 to approximately 500 MHz. The frequency band FB2 contains 1024 carriers, which have a frequency spacing of approximately 30 KHz, and each of which is frequency-modulated with one of the subscriber-assigned information signals.

The frequency-division multiplex signal with the frequency band FB2 produced by the modulation device 5 passes through a line designated in the same way into an electric-to-optical transducer 6, which converts it into an optical signal with a wavelength $\lambda_1$, identical to the wavelength of the transducer 3. This optical signal is then transmitted via the fiber-optic network (to be described below) to the subscribers $T_i$.

From the subscribers $T_i$, the center 1 receives a mixture of optical signals with a single wavelength $\lambda_2$, e.g., 1300 nm, which contains up to 1024 electrical signals from a third frequency band FB3, ranging from approximately 30 to 60 MHz (frequency plan according to FIG. 3). These electrical signals are subscriber-assigned carriers, onto which are modulated the subscriber-assigned information signals to be transmitted from the subscribers $T_i$ to the center, as will be explained below, by means of frequency modulation. The carriers have carrier frequencies from the frequency band FB3, with frequency spacings of approximately 30 KHz.

The received mixture of optical signals with a wavelength $\lambda_2$ is converted in an optical-to-electric transducer 7 into an electrical frequency-division multiplex signal with the frequency band FB3 and is fed through a line designated in the same manner into a demodulation device 8, which demodulates the signals contained in it and feeds them through 1024 parallel lines into the local switching center 4.

Each subscriber thus has two of the input and output lines of the local switching center 4 shown. For these, a converter circuit (not shown) is present, which carries out the signal conversions required between the local switching center 4 and the modulating and demodulating devices 5 and 8, respectively, e.g., the conversion from two-wire to four-wire operation and conversions of ringing signals, dialing signals and signaling characters.

The above-mentioned connections of the center 1 for optical signals with the wavelength $\lambda_1$ and the wavelength $\lambda_2$ are connected to the fiber-optic network in the following manner.

The optical signals appearing at the outputs of the transducers 3 and 6 of the center, with identical wavelengths $\lambda_1$, are grouped by means of optical-waveguide connecting sections and optical waveguide-couplers 20 and 21 into a single optical signal, and the optical waveguide-coupler 21 distributes the signal formed by the grouping to two optical-waveguide sections 22 and 23, from which it is distributed by means of optical waveguide-couplers 24 and 25 to four optical waveguides $LA_1$ to $LA_4$. The couplers 21, 24 and 25 are 3 dB couplers, while the coupler 20 is a wavelength-selective coupler. Thus, both the signals of the cable television system and also the subscriber-assigned signals are transmitted from the center to subscribers by means of each of these optical waveguides. This transmission direction will be referred to in the following explanation as the so-called downward direction, and the opposite transmission direction will be referred to as the so-called upward direction. The drawing shows the transmission via the optical waveguide $LA_4$ as a representative for the optical waveguides $LA_1$ through $LA_4$.

The optical waveguide $LA_4$ leads from the coupler 25, which is a branch point of a multistar fiber-optic network, to a merely schematically indicated power divider 26, which, in turn, is a branch point of the fiber-optic network, with a number, for example, 16, of further-going optical waveguides $LB_1$ through $LB_{16}$. As a result of the signal distribution that has taken place in the couplers 21 and 25, the level of the optical signal to be transmitted via the optical waveguide $LA_4$ has become so low that an amplification is required before it can be distributed to 16 further-going optical waveguides by means of the power divider 26. The previously mentioned fiber-optic amplifier 10 is used for this purpose. In order to protect it against optical signals reflected from the power divider 26 and the fiber-optic amplifier 11, an optical isolator 27 is inserted into the optical waveguide between the fiber-optic amplifier 10 and the power divider 26. The fiber-optic amplifier 10 and the optical isolator 27 are part of an optical amplifier section A, which also includes means for amplification of the optical signals to be transmitted in the upward direction, if such means are required at this point of the fiber-optic network. These means will be discussed below.

The couplers, power divider and optical waveguides $LA_1$ through $LA_4$ described so far, including the amplification sections A inserted in the latter and the four power dividers 26, are preferably located close to the center 1 or are included in the center.

Of the optical waveguides $LB_1$ through $LB_{16}$ continuing from the power divider 26, a representative optical waveguide $LB_5$ is shown which, like all of the others not shown, leads to a further branch point of the fiber-optic network, a power divider 28. This divides the optical signal transmitted in the downward direction into, for example, 16 further-going optical waveguides $LC_1$ through $LC_{16}$, each of which leads to a subscriber, as is shown for a representative optical waveguide $LC_7$ and a subscriber $T_i$. The power dividers 26 and 28 will sometimes also be referred to as couplers below.

Into the optical waveguide $LB_5$, as into the other optical waveguides corresponding to this, there is inserted an amplifier section B, which contains the above-mentioned fiber-optic amplifier 11 for amplification of the optical signal transmitted in the downward direction. An optical isolator for protection of the fiber-optic amplifier 11 is not required in the part of the fiber-optic network in which this is inserted, because the coupler 28 and the subscriber's devices can be arranged in such a way that very few reflections occur.

Under certain operating conditions, it is also possible to dispense with the optical isolator 27 in the amplifier section A.

The devices present at a subscriber $T_i$, who is representative for the plurality of subscribers connected to the center by means of the network described, will now be explained with reference to FIG. 2. The optical signal that the subscriber receives via the optical waveguide connecting them with the node 28 is converted in an optical-to-electric transducer 30 into an electric frequency-division multiplex signal, which contains the frequency bands $FB_1$ for the cable television signals and $FB_2$ for the subscriber-assigned signals, as shown in FIG. 3. This frequency-division multiplex signal is fed via an electric coaxial line, designated by KL, into the house cable-television wiring usually present at a subscriber and is transmitted by this to one or more television receivers 31. A bandpass filter transmitting the cable television band $FB_1$ can be inserted into this coaxial line, so that a standard cable television signal is emitted at its output. Its output can then also be considered as a transfer point, i.e., as an interface between the responsibility of the network operator and that of the subscriber.

In order to enable the subscriber to receive the signal intended for them among the subscriber-assigned signals contained in the frequency band $FB_2$, the electrical output signal of the transducer 30 is transmitted via a coaxial line to a demodulator 32. This is tuned to the carrier frequency assigned to the individual subscriber, e.g., to 500 MHz, so that the subscriber can extract the signal intended for him, and only this signal, from the totality of the subscriber-assigned signals transmitted to subscribers by means of the network described. The signal intended for the subscriber, e.g., a telephone signal, thus appears in the baseband position at the output of the demodulator 32, and this signal is conducted through a converter to a conventional terminal, e.g., a telephone.

To transmit a telephone or data signal from the subscriber to the center, the subscriber has a modulator 35, which converts the signal fed into it from the output of the converter 33, to which the terminal 34 is connected, into the frequency position individually assigned to the subscriber, by frequency-modulating a specific carrier from the frequency band $FB_3$, e.g., a carrier with 60 MHz. The subscriber also has an electric-to-optical transducer 36 for conversion of the electrical signal produced by the modulation into an optical signal with a wavelength $\lambda_2$ and a fiber-optic coupler 37, which injects the optical signal with the wavelength $\lambda_2$ into the optical waveguide located between the coupler 28 and the subscriber. The coupler is a wavelength-selective coupler, which couples light with the wavelength $\lambda_1$ practically only to the input of the transducer 30 and couples light with the wavelength $\lambda_2$ from the output of the transducer 36 only in the direction of the coupler 28 and practically not in the direction of the input of the transducer 30. The wavelength $\lambda_2$ preferably has a value of 1300 nm, which is an advantageous value for transmission to the center, as will be explained below.

The converter 33 carries out the signal conversions required for the transmission of the signals from and to the standard terminals according to the invention, e.g., a two-wire to four-wire conversion, and the conversion of ringing signals, dialing signals and signaling characters, so that its connection connected to the terminal 34 is to be considered as an interface, at which standard signals for the connected terminal are present.

In the system described, the number of telephone or data terminals that a subscriber can have is equal to the number of frequencies that can be individually assigned to them from the frequency bands $FB_2$ and $FB_3$, i.e., more than one telephone or data terminal if the number of carrier frequencies available in the above-mentioned frequency bands is larger than the number of subscribers.

It will be explained below how the optical signals that are to be transmitted from the large number of subscribers in the upward direction to the center, and which all have the same wavelength $\lambda_2$, are transmitted. In principle, the same fiber-optic network is used as for the signal transmission in the downward direction described above.

On the optical waveguides $LC_1$ through $LC_{16}$ between the subscribers and the coupler 28, an amplification of the optical signal with the wavelength $\lambda_2$ is not required.

It is true that the coupler 28 attenuates each of the optical signals to be transmitted in the upward direction, because, in principle, it attenuates the signals to be transmitted in the upward direction in the same manner as those to be transmitted in the downward direction, in accordance with its division ratio. Nevertheless, as has been shown by calculations, an amplification of the optical signals in the upward direction is also not required between the coupler 28 and the coupler 26, but becomes necessary only after the optical signals have been transferred from the coupler 26 into the optical waveguide $LA_4$. As shown by the Figure, no amplification of the signal to be transmitted in the upward direction is planned at the location of the amplifier B; such means are present only at the location of the amplifier A, as will be explained later. In the case of larger division ratios at the coupler 28, however, an amplification in the upward direction can also be provided for at the location of amplifier B, in the same way as at the location of amplifier A.

The optical signals to be transmitted in the upward direction, amplified in the amplifier section A and all with a wavelength $\lambda_2$, are transmitted via the couplers 25 (or 24), 21, and 20 to the above-described transducer 7 in the center. As described above, a demodulation device 8 ensures that each subscriber-assigned input line of the local switching center 4 will have supplied to it precisely the signal intended for it, from among the subscriber-assigned signals.

The wavelength $\lambda_2$ of the optical signals to be transmitted in the upward direction is selected such that it is favorable for the components of the system through which the signals have to pass. Optical signals with a wavelength of 1300 nm are practically not attenuated in a fiber-optic amplifier designed for 1550 nm, such as is known today. For this reason and because, at the wavelength of 1300 nm, the standardized optical waveguides have favorable transmission properties and commercial optical transmitters and receivers are available for this wavelength, $\lambda_2$ is preferably selected to have a value of 1300 nm.

Although cheaper optical transmitters and receivers would be available at a wavelength of 800 nm, the attenuation of light with a wavelength $\lambda_2 = 800$ nm in the amplifier section B would be a considerable problem, because the erbium-doped length of fiber typical for a fiber-optic amplifier absorbs strongly at 800 nm.

As mentioned, in the section $LA_4$ i.e., in the amplifier section A, an amplification of the optical signals to be transmitted in the upward direction is required. The optical amplification of the 1300-nm signals transmitted in the upward direction can be accomplished, for example, by means such as shown in FIG. 1. These means include a wavelength-selective fiber-optic coupler 40, which extracts the 1300-nm signal from the optical waveguide $LA_4$, and a fiber-optic amplifier 41 optimized for 1300 nm, whose amplified output signal is injected into the optical waveguide $LA_4$ for further transmission in the upward direction by a second wavelength-selective coupler 42. If required, an optical isolator 43 can be present between the optical waveguide $LA_4$ and the output of the fiber-optic amplifier 41, to protect the fiber-optic amplifier against reflected signals. An optical semiconductor amplifier can also be used in place of the fiber-optic amplifier 41.

Means such as this, as will be explained below with reference to FIG. 4, can be used in place of the means shown in FIG. 1 for amplification of the signals to be transmitted in the upward direction in an amplifier section A.

FIG. 4 shows an amplifier section A in a form different from that shown in FIG. 1. Like that in FIG. 1, the section according to FIG. 4 also contains a known fiber-optic amplifier 10 which, as usual, consists of an $Er^{3+}$-doped length of fiber 50, a wavelength-selective fiber-optic coupler 51, and a pump source 52. As the coupler 51, a wavelength-selective fiber-optic coupler should be used that has the property of putting out the optical signal passing from the input of the fiber-optic amplifier 10 to its output, with the wavelength $\lambda_1$, as unattenuated as possible at its coupler output leading to the output of the fiber-optic amplifier 10 and putting out the pump light produced by the pump source 52, with a wavelength $\lambda_p$ of 980 nm, from its coupler input connected to the pump source 52, with as little loss as possible, in the direction of the doped length of fiber 11.

According to the invention, the optical signal to be transmitted in the upward direction, with a wavelength $\lambda_2$ (1300 nm), is now extracted from the optical waveguide, amplified, and transmitted further in the upward direction. The free connection of the coupler 51 in the fiber-optic amplifiers known in themselves is used for extracting the optical signal transmitted in the upward direction, with a wavelength $\lambda_2$, from the optical waveguide. It is connected via an optical waveguide section 53 with the input of an optical-to-electric transducer 54, which converts the optical signal to an electrical signal. In the simplest case, the electrical output signal of the transducer 54 is injected directly into the laser driver of the pump source and thereby modulates the intensity of the light produced by the pump source 52.

The frequencies contained in the modulating electrical signal, as explained above, are located in a frequency band between 30 and 60 MHz. It is thus impossible for the modulation of the pump light to modulate the amplification that the optical signal to be transmitted from the input of the fiber-optic amplifier to its output (in the downward direction), with a wavelength $\lambda_1$, undergoes during passage to the amplifying length of fiber 50. This is because, from this viewpoint, in principle, all frequencies are suitable as modulation frequencies that are very much larger than the reciprocal of the lifetime of the energy states of the $Er^{3+}$-doped material of the length of fiber 50 excitable by the pump light, i.e., frequencies above 1 MHz, and the frequency band $FB_3$ is located distinctly above that value.

Otherwise, the output signal of the transducer 54 would have to be modulated onto an auxiliary carrier frequency by means of an auxiliary modulation device, shown by broken lines in FIG. 4 and designated by the reference number 55, so that a modulation signal suitable for the pump source is formed.

In normal operation, the intensity of the pump light is so high that, from the end of the length of fiber 50 that is further from the coupler 51, a considerable portion which is not absorbed in the length of fiber 50, passes into the optical waveguide leading further in the direction of the center and, from there, is transmitted further in the direction of the center. The optical signal to be transmitted in the upward direction is therefore transmitted to the center by the amplifier section A not with a wavelength of $\lambda_2$ as in FIG. 1, but with a wavelength of $\lambda_p$.

It is, of course, also possible that the pump source initially produces unmodulated light and that the output signal of the transducer 54 is used to modulate the pump light in a modulator connected in series with the pump source. In this case also, the pump light produced by the pump source is modulated.

The design of the amplifier section A described above is an application of the invention which, in itself, is the object of a prior German patent application P 40 36 327, in which the additional signal mentioned there, to be transmitted by modulation of the pump source, is made available by removal at the free end of the coupler 51 and optical-to-electric transduction. The signal to be transmitted in the upward direction undergoes the required amplification in the present case by the fact that the electrical output signal of the transducer 54 is brought to a level sufficiently high for modulation of the pump source and that the pump light is intensive enough to ensure further transmission to the center.

Figure 5:
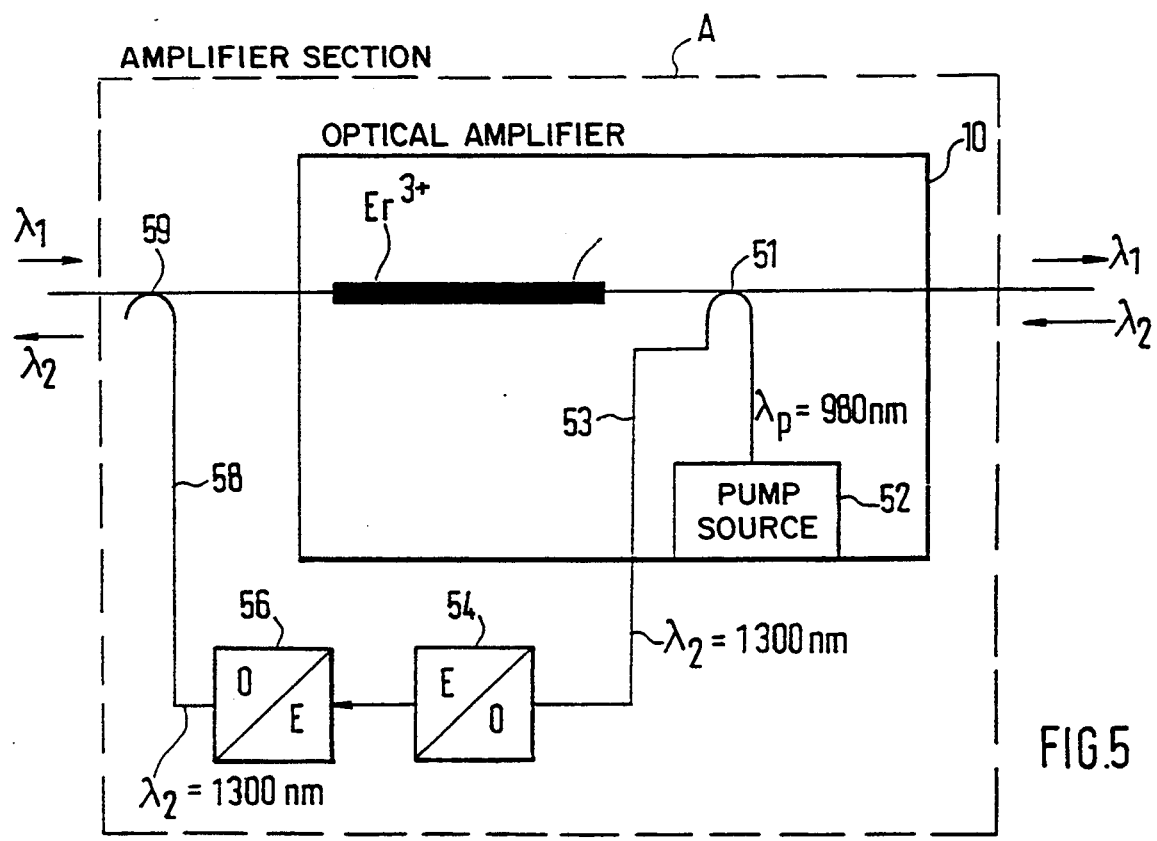
FIG. 5 shows a third embodiment of the amplifier section A of FIG. 1.

A third form of the amplifier section A of FIG. 1 will now be explained with reference to FIG. 5. It contains the same fiber-optic amplifier 10 as that according to FIG. 4. Also as in FIG. 4, the free connection of the coupler 51 in the known fiber-optic amplifiers is connected via an optical waveguide section 53 with the input of an optical-to-electric transducer 54, which converts the optical signal with a wavelength $\lambda_2 = 1300$ nm to an electrical signal. The electrical output signal of the transducer 54 is fed to the electrical input of an electric-to-optical transducer 56, which converts it to an optical signal with a wavelength $\lambda_2 = 1300$ nm. From the optical output of the transducer 56, the optical signal passes through an optical waveguide section 58 to a wavelength-selective coupler 59, which, for further transmission in the upward direction, injects it into the optical waveguide leading from the amplifier section A in the direction of the center (to the left in the drawing). This optical signal, in comparison with the optical input signal of the transducer 54, is amplified, because the transducer 54 typically also performs amplifying functions.

It should also be mentioned that an optical amplifier section A, regardless of its form, which amplifies not only the signal transmitted in the downward direction but also that transmitted in the upward direction, can be inserted not only in the sections shown for the embodiment according to FIG. 1, but can be inserted in any sections of the whole system in which a "bidirectional" amplification of this type is required. In the embodiment according to FIG. 1, there is the advantage that only four amplifier sections of the somewhat more expensive type A are required to supply more than 1,000 subscribers with both distribution services and dialog services.

In the center, this large number of subscribers requires only a single, expensive optical transmitter which, because of the large bandwidth of its electrical input signal (80 to 450 MHz), must contain a highly linear and therefore expensive laser.

Even this requirement can be modified if the frequency bands located at the input sides of the two transducers 3 and 6 are made to be approximately the same size by division and combination, so that, for example, one transducer has to process a frequency band of 30 to 240 and the other a frequency band of 240 to 450.

The system can, of course, be expanded by the addition of other branch points, but it should be considered in each case whether the relationship between the costs and the achievable benefit is reasonable.

It should be mentioned further that the number of optical waveguides going further in the downward direction from the couplers 26 and 28, instead of having a value of 16 as in the embodiment, can also have values of n or m, which are of the order of magnitude of 16, e.g. n=18, m=20. Furthermore, the number of optical waveguides $LA_1$ through $LA_4$, on which a branching takes place close to the center or in the center, need not have a value of 4, as shown in the embodiment. The number could also have different value, e.g., 5, of the order of magnitude of 4.

Explained below is a modification of the new system relating to the selection of the frequencies with which the subscriber-assigned information signals are transmitted between the center and the subscribers and vice versa.

The modification consists of the fact that the frequencies assigned to the individual subscribers are not permanently assigned, as is described with reference to the embodiment according to FIG. 1 and FIG. 2, but that means are available for assigning to a subscriber one of n frequencies from one band and one of n frequencies from the other frequency band, where n is distinctly smaller than the number of subscribers. This assignment is carried out when required, i.e., a subscriber is assigned one of these n frequencies only when a connection between the subscriber and the center for the purpose of bidirectional communication is actually required. As long as a subscriber does not wish to communicate with another subscriber and also is not called by a subscriber connected to the center, he is not assigned any of the n frequencies, which are available to the other subscribers.

For an assumed maximum traffic density of 0.1 Erl, approximately 100 channels are sufficient for a group of approximately 1000 subscribers to take care of the telephone and data traffic between the center and the 1000 subscribers.

The assignment of the frequencies, i.e., channels to the subscribers can be designated as a dynamic assignment, in contrast to the assignment described with reference to FIG. 1 and FIG. 2, which is a fixed or static assignment. The assignment is individual for the subscribers in all cases, because, at a specific time, a frequency, i.e., channel, is assigned to only a single subscriber.

An example containing the modification from the above embodiments will now be described with reference to FIGS. 6 through 8.

As in the embodiment according to FIG. 1, the center contains a local switching center 4, to which the subscribers under consideration are connected via the fiber-optic network. In the same way as in the above embodiments, the switching center 4 has output and input connections, which are connected with modulators and demodulators, respectively. Each subscriber has his own modulator in the center, and FIG. 6 shows two modulators $MZ_1$ and $MZ_{1000}$, which are representative for the modulators of the approximately 1000 subscribers connected to a switching center 4. The same holds true for the demodulators, of which only two are shown as representative of all, and are designated as $DZ_1$ and $DZ_{1000}$.

If, for example, a signal is to be transmitted from the switching center 4 to subscriber No. 1, then this appears at a subscriber output $A_1$ of the switching center and, from there, passes to the modulator $MZ_1$ of this subscriber, which has the task of modulating it onto a carrier and thereby converting it into a specific frequency band. The modulated signals from the outputs of the modulators are combined in a power adder 61 to a frequency-division multiplex signal, which occupies a specific frequency band. Each of the demodulators receives a frequency-division multiplex signal, occupying a different frequency band, from the totality of the subscribers, as shown in FIG. 1, and has the task of converting any signal contained therein and belonging to a specific subscriber from the frequency position assigned to the subscriber to the base band position, in which it is fed into the corresponding subscriber input of the switching center 4. Of the totality of all subscriber inputs of the switching center 4, only two are shown and are designated by $E_1$ and $E_{1000}$. A power divider 62 is used for distribution of the frequency-division multiplex signals over the demodulators. As far as has been explained so far, there is no difference from the demodulators that were explained with reference to FIG. 1.

The significant difference is that each modulator and each demodulator is adjustable to one of n frequencies, where n has a value of, for example, 100 if the number of subscribers is 1000. In other words: the frequency of the carrier onto which a modulator modulates its input signal and the frequency of a carrier modulated with a signal, which a demodulator can recover by demodulation, are not fixed but are adjustable. A frequency control 63 present in the center makes sure that a frequency is assigned to a subscriber only if required and that the selected assignment is on an individual basis for subscribers, i.e., that the same frequency is never assigned to several subscribers at the same time.

The assignment of the frequencies to the modulators and the demodulators by means of the frequency control 63 is carried out as follows: The frequency control 63 is connected with every modulator-demodulator pair present for a subscriber in the center by means of a data and control line. In the case of the modulator-demodulator pair of subscriber No. 1, this line is designated by $S_1$, and in the case of the modulator-demodulator pair of subscriber No. 1000, it is designated by $S_{1000}$. These lines, which are practically bus lines, are shown in FIG. 6 as distinctly thinner lines than those used for the lines for transmission of the useful subscriber signals.

Bidirectional communication between a subscriber and the center can, as is typical for telephone traffic, be initiated either by the center, i.e., by the switching center 4, or by the subscriber. In other words: either the switching center calls a subscriber or the subscriber transmits a ringing signal to the switching center. In both cases, it must be made sure that the frequencies are assigned for the information connection to be established.

In the first case, when the switching center wishes, for example, to send a call to subscriber No. 1, the modulator $MZ_1$ detects the fact that, at the subscriber output $A_1$, the condition typical for a call going from the switching center to a subscriber is present. When the output $A_1$, together with the input $E_1$, forms a subscriber connection of an analog switching center, i.e., a classical connection for a subscriber line with an a, b wire, then this is a specific current-voltage state of the a, b wire. If this involves an $S_o$ interface of an ISDN switching center, then this is the ringing signal state typically present in the case of a ringing signal going from the switching center to a subscriber at such an interface. In each case, the modulator $MZ_1$ detects the fact that a call is to be sent from the switching center to subscriber No. 1 and signals this state to the frequency control via the line $S_1$. This then searches for a free channel for the modulator $MZ_1$. It does this by continuously querying the status of all modulators via the particular control and data lines as to whether, and with what frequency, they are transmitting an information signal. On the basis of such continuous querying, information as to which of a total of n occupiable frequencies are unoccupied at the moment is stored in the frequency control. If it finds an unoccupied frequency, then it issues a control command corresponding to this frequency via the control line $S_1$ to the modulator $MZ_1$, causing the latter to adjust itself to the frequency found. In the embodiment according to FIG. 6, this frequency is designated by $f_i$. It is one of the n frequencies of a frequency band FB2', which will be explained later.

Figure 6:
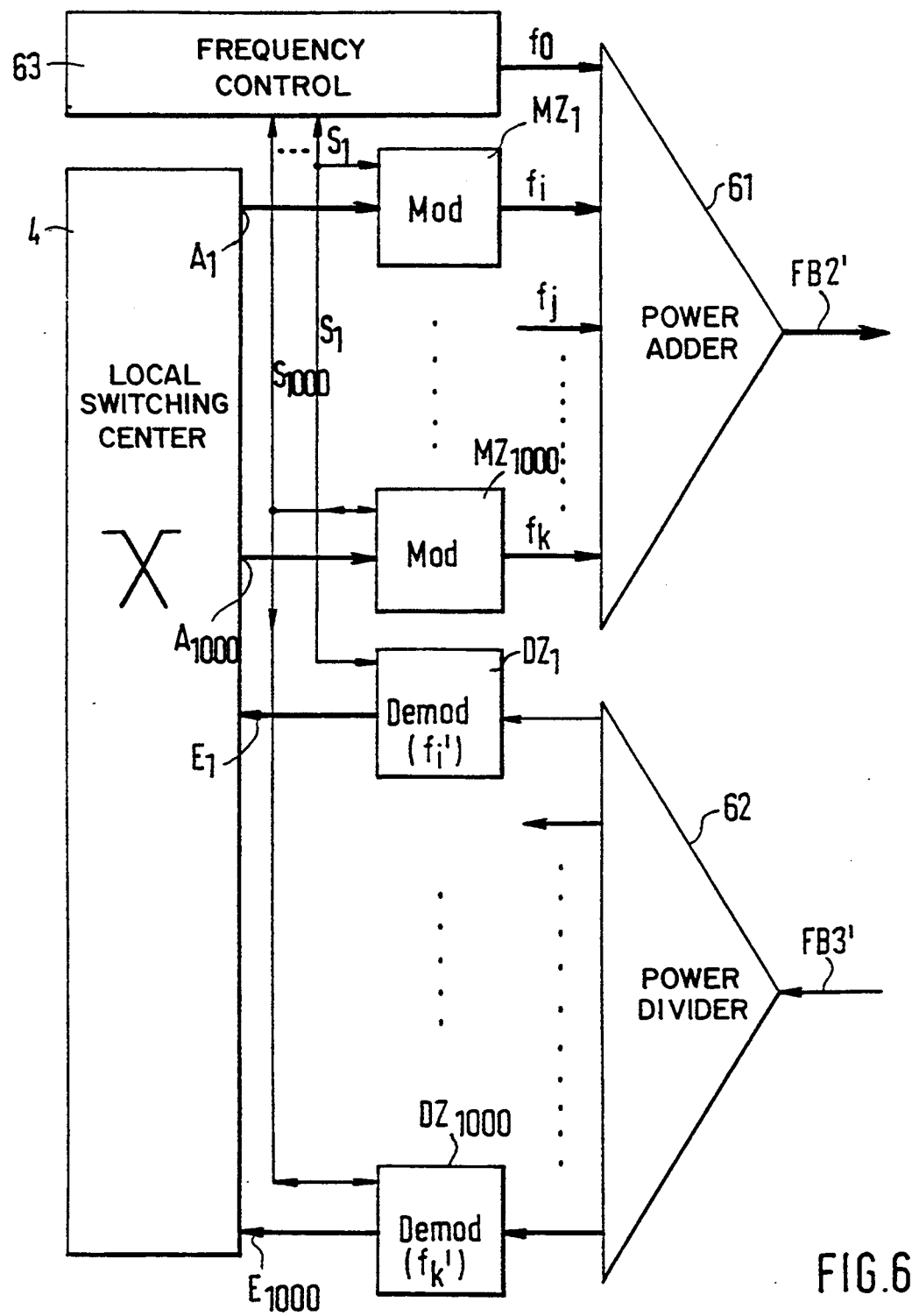
FIG. 6 shows an embodiment of devices present in the center for dynamic assignment of the frequencies to the subscribers.

According to an advantageous characteristic of the embodiment according to FIG. 6, a subscriber is always assigned two frequencies for the two transmission directions, which differ from each other by a preset amount. If, for example, the frequency control selects a frequency $f_i$ of 960 MHz for transmission to subscriber No. 1, then it also simultaneously selects a frequency $f_i'$ for the demodulator $DZ_1$ of the same subscriber, which is lower by, for example, 60 MHz and therefore has a value of 900 MHz in the example under consideration.

Figure 7:
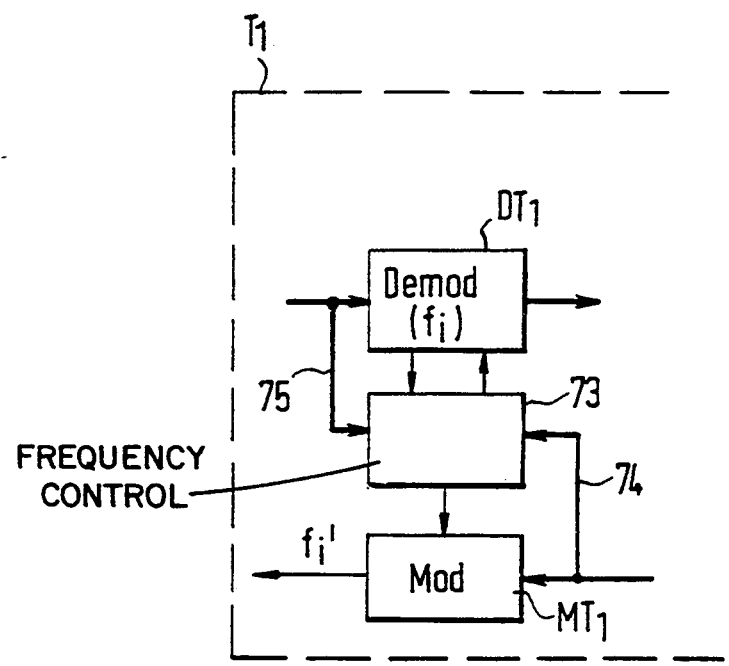
FIG. 7 shows an embodiment of devices present at a subscriber for dynamic assignment of the frequencies to the subscriber.

If it is a subscriber who initiates a bidirectional communication with the center, i.e., in practice by sending a call to the center, then the frequency assignment to the subscriber takes place as follows:

FIG. 7 shows the part of a subscriber device $T_l$ of the system according to the invention required for frequency assignment to the subscriber. To explain the frequency assignment to a specific subscriber, this subscriber device is considered as that of subscriber No. 1 of a total of 1000 subscribers connected to the center. Like the subscriber device of FIG. 2, it contains a modulator and a demodulator, which, however, are adjustable in frequency in this case. These are designated by $MT_1$ and $DT_1$. Their frequencies are adjusted by means of a frequency control 73.

If a ringing signal that the subscriber device wishes to transmit to the center arrives from the subscriber terminal at the input of the modulator $MT_1$, then it also arrives directly or via the modulator at an input of the frequency control 73, in the example shown via a line 74. On the other hand, coming from a frequency control channel on an input line 75, the frequency control 73 continuously receives information about the current occupancy of the frequencies that are continuously transmitted by the frequency control 6 of the center to the totality of the subscribers, by modulating an additional carrier, which has a frequency $f_0$, with the information. From the receipt of such information, the frequency control has knowledge about free frequencies that can be considered for a transmission from a subscriber to the center, i.e., that have not already been assigned to a modulator of another subscriber. If one of the frequencies in question is unoccupied, then the frequency control 73 causes the modulator $MT_1$ to adjust itself to this frequency and, at the same time, also causes the demodulator $DT_1$ to adjust itself to a frequency from the other frequency band, differing by the above-mentioned fixed preset amount. In the drawing, it is indicated that the modulator $MT_1$ modulates the call to the center onto a carrier with a frequency $f_i$, transmits it to the center, and that the demodulator $DT_1$ is adjusted for the reception of a signal with the carrier frequency $f_i$.

The demodulators in the center, e.g., $DZ_1$, and the demodulators at the subscribers, e.g., $DT_1$, controlled by the frequency control 63, 73 present in each case, scan the frequency band intended for them to determine whether one of the n frequencies is modulated with a ringing signal from the subscriber to which they belong or a ringing signal to the, subscriber to which they belong. As long as they are operating in this scanning state, they block their information signal output leading to the switching center or to the subscriber terminal. If a subscriber's demodulator, on the center side or on the subscriber side, determines that one of the scanned frequencies is modulated with a ringing signal that is specifically assigned to this subscriber, then the frequency control contained in the demodulator adjusts it to this frequency and also adjusts the modulator of the same modulator-demodulator pair to a frequency of the other frequency band, differing by the fixed preset amount from the frequency found.

For example, after the modulator $MZ_l$ has been adjusted by the frequency control 63 to a frequency of, e.g., $f_i$ for the purpose of a ringing signal to be transmitted from the switching center 4 to the subscriber $T_1$, the demodulator $DT_1$ at the subscriber $T_1$ detects the call directed to it at the frequency $f_i$ by scanning of the frequencies, and the frequency control then adjusts it to this frequency $f_i$ and, at the same time, adjusts the modulator $MT_1$ to the frequency $f_i'$ (e.g., 900 MHz). The frequency control has already adjusted the demodulator $DZ_1$ in the center to this frequency, simultaneously with the frequency adjustment of the modulator $MZ_1$.

Whereas, in the other case, it was the modulator $MT_1$, which was adjusted to a free frequency $f_i'$ (e.g., 900 MHz) by the frequency control 73 for transmission of a call to the center, the demodulator $DZ_1$ in the center, by scanning all reception frequencies, determines that this frequency is modulated with a ringing signal from the subscriber $T_1$. After this, the frequency control 63 connected with it serves to adjust the modulator $MZ_1$ to a frequency $f_i$ (e.g., 960 MHz) higher by the fixed preset amount.

If a modulator, either the one in the center or the one at the subscriber, detects from the state of its input line that the subscriber has gone over into the call termination state or data transmission termination state, then it stops transmitting with the adjusted carrier frequency, and thus releases this. At the same time, the frequency control makes sure that the associated demodulator changes to the state of scanning the frequencies to be considered as reception frequencies.

It was explained above that the frequency control of the center queries the state of the modulators in order to find a free frequency for a modulator. Since the transmission and reception frequency of a subscriber's modulator-demodulator pair, as described above, are in a fixed relationship to each other, it is also possible that the frequency control in the center obtains the knowledge about free frequencies from the result of the continuous scanning of the frequency band provided for the demodulators by the demodulators, instead of continuously querying the status of the modulators. In a corresponding manner, it is possible with the subscribers that the frequency control obtains the knowledge about free frequencies for demodulators from the continuous scanning of the frequency band provided for the demodulators, instead of evaluating the information about the occupancy status of frequencies received in the frequency control channel by means of the center. In this case, it is generally possible to dispense with the setting up of the frequency control channel.

It should also be mentioned that the demodulators release their information signal output after detection of a subscriber-specific ringing signal. It should also be mentioned that, instead of a central frequency control 63, as shown in FIG. 6, subscriber-assigned frequency controls can also be provided in the center, as explained for a subscriber with reference to FIG. 7. In this case, the controls are of the type that evaluate the scanning by the subscriber-specific demodulator instead of centrally determined and stored information.

Another variation would be if, on the side of the center, the number of modulator-demodulator pairs is not the same as the number of subscribers, but is equal to the number of frequency channels available, i.e., in this example, not 1000 but only 100, that the modulators and demodulators are set to fixed frequencies, and a switching device is present between the normal switching center 4 and the modulators, which connects the outputs of the normal switching center with the inputs of modulators free at the time and the outputs of the demodulators with inputs of the just called subscriber connections of the switching center. With this type of arrangement of the devices present in the center, it would also be made sure that a subscriber would have a pair of frequencies for the two transmission directions assignable to them as required and on a subscriber-specific basis.

In the embodiment according to FIG. 6, it is shown by the selected frequency designations that different subscribers are assigned different frequencies and that the frequencies assigned to a modulator and to a demodulator assigned to the same subscriber are in a specific relationship to each other.

Figure 8:
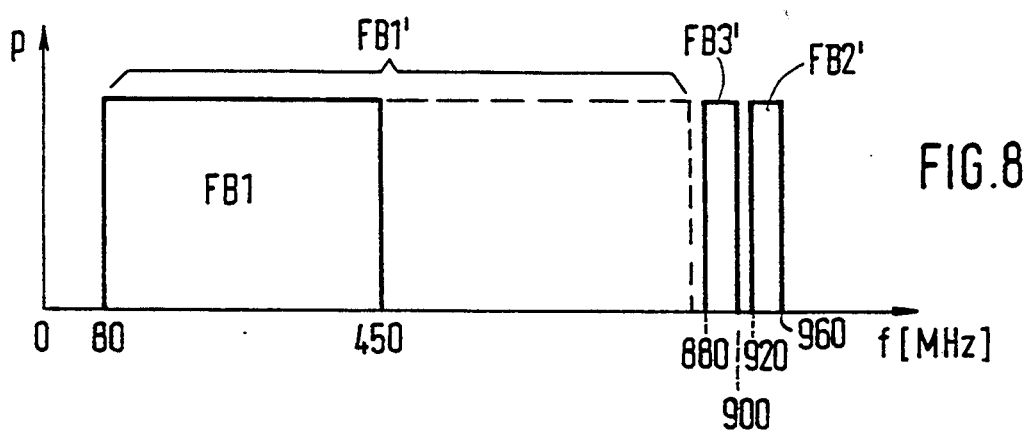
FIG. 8 shows a second frequency plan for the signal frequencies used for signal transmission according to the system of the invention.

FIG. 8 shows the position of the frequency bands in which the frequencies described above are located. A frequency band FB2' is provided for transmission from the center to the subscribers and a frequency band FB3' for transmission in the reverse direction, with the former being located above the latter. In contrast to the frequency plan according to FIG. 3, both are located above the frequency band FB1 provided for the signals to be distributed to the subscribers, such as television signals. FB3' ranges from 860 to 900 MHz and FB2' ranges from 920 to 960 MHz. For this position, the frequency band FB1 can be distinctly increased as compared to that shown in FIG. 3, as indicated by FB1'.

By means of the variable frequency assignment described, it is possible to carry out the frequency assignment in a manner flexible with respect to the bandwidth that is provided for the subscriber connection. If a subscriber connection is a connection for normal telephone service, then, in the channel assignment, a smaller separation from such a narrowband channel can be provided, whereas a larger channel separation can be adjusted when a channel with a greater bandwidth, e.g., an ISDN channel or even a channel with an even greater bandwidth of, e.g., 2 Mbit/s is involved. A further advantage is the fact that, because of the overall smaller number of channels required, there is a saving in bandwidths for the frequency-division multiplex signal to be formed, which facilitates the optical transmission of the frequency-division multiplex signal.

What is claimed is:

1. Fiber-optic communications systems having a center (1) and a plurality of subscribers ($T_i$) wherein the subscribers ($T_i$) are connected to the center (1) via a multistar fiber-optic network ($LA_i$, $LB_i$, $LC_i$), wherein fiber-optic amplifiers (10, 11) are provided between successive branch points of the multistat fiber-optic network ($LA_i$, $LB_i$, $LC_i$), and wherein the center (1) distributes broadband information signals, such as television signals, as an optical signal on a first wavelength ($\lambda_1$) in a first frequency band (FB1), over the multistar fiber-optic network ($LA_i$, $LB_i$, $LC_i$) to the subscribers ($T_i$), and wherein the optical signal is amplified by the fiber-optic amplifiers (10, 11), characterized in that the center (1) has means for transmitting subscriber-assigned information signals, such as telephone signals, to the subscribers ($T_i$) over the multistar fiber-optic network ($LA_i$, $LB_i$, $LC_i$), the subscriber-assigned information signals being transmitted on the first wavelength ($\lambda_1$) in a second frequency band (FB2) with separate subscriber-assigned frequencies, the optical signal being amplified in the fiber-optic amplifiers (10, 11);

each subscriber ($T_i$) has means for transmitting subscriber-assigned information signals, such as telephone signals, to the center (1), the subscriber-assigned information signals being transmitted on a second wavelength ($\lambda_2$) in a third frequency band (FB3) with separate subscriber-assigned frequencies; and the multistat fiber-optic network has at least one means (40, 41, 43; 51, 54, 52) for extracting the subscriber-assigned information signals transmitted on the second wavelength ($\lambda_2$) from an optical waveguide (LA$_4$), amplifying them, and reinjetting them into the optical waveguide (LA$_4$) for transmission to the center (1).

2. A system as claimed in claim 1, characterized in that in or near the center (1), the multistat fiber-optic network branches into several optical waveguides (LA$_1$ to LA$_4$), that each of the several optical waveguides leads to a power divider (26) having n outgoing optical waveguides (LB$_1$ to LB$_{16}$) connected thereto, and that each of said n optical waveguides (LB$_1$ to LB$_{16}$) leads to a power divider (28) from which each of m optical waveguides (LC$_1$ to LC$_{16}$) leads to a subscriber (T$_1$).

3. A system as claimed in claim 1, characterized in that the first wavelength ($\lambda_1$) is approximately 1550 nm, and that the second wavelength ($\lambda_2$) is approximately 1300 nm.

4. A system as claimed in claim 3, characterized in that the second frequency band (FB$_2$) and the third frequency band (FB$_3$) lie above and below the first frequency band (FB$_1$), respectively.

5. A system as claimed in claim 4, characterized in that the second frequency band (FB$_2$) extends from approximately 470 to 500 MHz, that the third frequency band (FB$_3$) extends from approximately 30 to 60 MHz, that the subscriber-assigned frequencies lying in said bands are approximately 30 kHz apart, and that the conversion of the subscriber-assigned information signals to the frequency bands is done by frequency-modulating the subscriber-assigned frequencies.

6. A system as claimed in claim 1, characterized in that the means (40, 41, 42; 51, 53, 54, 52) for extracting the optical signal to be transmitted to the center (1) from the optical waveguide (LA$_4$), amplifying it, and reinjecting it into the optical waveguide (LA$_4$) are wavelength-selective fiber-optic couplers (40, 42) and a fiber-optic amplifier (41) optimized for the wavelength ($\lambda_2$) of the optical signal to be amplified.

7. A system as claimed in claims 1, characterized in that the means for transmitting subscriber-assigned information signals from the center to the subscribers and from the subscribers to the center include means for assigning to a subscriber (T$_1$), as required and on an individual basis, one (f$_i$) out of n frequencies from the second frequency band (FB2') and one (f$_i$') out of n frequencies from the third frequency band (FB3'), where n is clearly less than the number of subscribers.

8. A system as claimed in claim 7, characterized in that
the means for transmitting subscriber-assigned information signals include one modulator-demodulator pair (MZ$_1$, DZ$_1$) per subscriber at the center and one modulator-demodulator (MT$_1$, DT$_1$) at the subscriber (T$_1$);
the frequency (f$_i$) assigned to a subscriber (T$_l$) from the assigned frequency band (FB2') is the frequency of a carrier which is modulated by the modulator (MZ$_1$) at the center with the information signal to be transmitted to the subscriber and is received with this modulation and demodulated by the demodulator (DT$_1$) at the subscriber (T$_1$), and;
the frequency assigned to the subscriber (T$_1$) from the third frequency band (FB3') is the frequency of a carrier which is modulated by the modulator (MT$_1$) at the subscriber with the information signal to be transmitted to the center and is received with this modulation and demodulated by the demodulator (DZ$_1$) at the center.

9. A system as claimed in claim 8, characterized in that the means assigning the above-mentioned frequencies (f$_i$, f$_i$') to a subscriber select a frequency from the second frequency band (FB2') and a frequency from the third frequency band (FB3'), which differ from each other by a fixed preset amount.

10. A system as claimed in claim 9, characterized in that
if the center initiates a bidirectional communication with a subscriber (T$_1$),
a frequency control present in the center searches for a frequency (f$_i$) not occupied by other subscribers among the said n frequencies of the second frequency band (FB2') and adjusts the modulator belonging to the subscriber in the center (MZ$_1$) to this frequency (F$_i$) and adjusts the demodulator belonging to the same subscriber in the center (DZ$_1$) to a frequency (F$_i$') from the third frequency (FB3'), differing from the frequency found for the modulator (F$_i$) by the fixed preset amount, and
if a subscriber initiates a bidirectional communication with the center,
a frequency control present at the subscriber searches for a frequency (f$_i$') not occupied by other subscribers from among the said n frequencies of the third frequency band (FB3') and adjusts the modulator (MT$_1$) at the subscriber (T$_1$) to this frequency and adjusts the demodulator (DT$_1$) present at the same subscriber (T$_1$) to a frequency (F$_i$) from the second frequency band (FB2') differing from the frequency found for the modulator (f$_i$') by the fixed preset amount, that
the demodulators present per subscriber in the center (DZ$_1$) through DZ$_{1000}$) and the demodulators present at the subscribers (DT$_1$), as long as a frequency has not been assigned to them, scan the frequency band provided for them, controlled by the respective frequency control, to determine one of the n frequencies is modulated with a ringing signal to the subscriber or from the subscriber and that the particular frequency control, if this is found for one of the frequencies, adjusts the demodulator to this frequency and demodulator of the same modulator-demodulator pair to a frequency from the other frequency band, differing from the found frequency by the fixed preset amount.

11. A system as claimed in claim 7, characterized in that the second frequency band (FB2') is located above the third band (FB3') and the latter is located above the first frequency band (FB1 or FB1').

12. A system as claimed in claim 11, characterized in that the second frequency band (FB2') is, for example, a band of 920 to 960 MHz and the third frequency band (FB3') is, for example, a band of 880 to 920 MHz.

13. A system as claimed in claim 7, characterized in that the frequency control present in the center modulates an additional frequency (f$_0$) with information on the current occupancy of the n frequencies and that the signal thus formed is transmitted to all subscribers and that the frequency control present at the subscribers, as long as a subscriber has not occupied any frequency, receives this signal and uses it to search for an unoccupied frequency.

14. A system as claimed in claim 2, characterized in that the second frequency band (FB$_2$) and the third frequency band (FB3) lie above and below the first frequency band (FB1), respectively.

15. A system as claimed in claim 2, characterized in that the means (40, 41, 42, 51, 53, 54, 52) for extracting the optical signal to be transmitted to the center (1) from the optical waveguide (LA4), amplifying it, and reinjecting it into the optical waveguide (LA4), are wavelength-selective fiber-optic couplers (40, 42) and a fiber-optic amplifier (41) optimized for the wavelength ($\lambda_2$) of the optical signal to be amplified.

16. A system as claimed in claim 2, characterized in that the means (51, 53, 54, 52) for extracting the optical signal having the second wavelength ($\lambda_2$) to be transmitted to the center from the optical waveguide (LA4), amplifying it, and reinjecting it into the optical waveguide (LA4) are a wavelength-selective pump coupler (51) associated with the fiber-optic amplifier (10), an optical-to-electric transducer (54), and the pump source (52) associated with the fiber-optic amplifier (10), and that said means are interconnected so that the optical signal having the second wavelength ($\lambda_2$) to be amplified and transmitted to the center is fed from one port of the pump coupler (51) to an input of the optical-to-electric transducer (54), and that an electric output signal of said optical-to-electric transducer (54) modulates the pump light generated by the pump source (52).

17. A system as claimed in claim 2, characterized in that the means (51, 53, 54, 56, 58, 59) for extracting the optical signal having the second wavelength ($\lambda_2$) to be transmitted to the center from the optical waveguide (LA4), amplifying it, and reinjecting it into the optical waveguide are a wavelength-selective pump coupler (51) associated with the fiber-optic amplifier (10), an optical-to-electric transducer (54), and an electric-to-optical transducer (56), and a wavelength-selective fiber-optic coupler (59) which couples an optical output signal of the electric-to-optical transducer (56) into the optical waveguide (LA4).

18. A system as claimed in claim 2, characterized in that the means for transmitting subscriber-assigned information signals from the center to the subscribers and from the subscribers to the center include means for assigning to a subscriber (T1), as required and on an individual basis, one ($f_i$) out on n frequencies from the second frequency band (FB2') and one ($f_i'$) out of n frequencies from the third frequency band (FB3'), where n is clearly less than the number of subscribers.

19. Fiber-optic communications systems with a center (1) and a plurality of subscribers (T$_i$) wherein the subscribers are connected to the center (1) via a multistar fiber-optic network (LA$_i$, LB$_i$, LC$_j$), wherein fiber-optic amplifiers (10, 11) are provided between successive branch points of the fiber-optic network, and wherein the information signals, particularly television signals, to be distributed by the center (1) to the subscribers (T$_i$), after being converted to a first frequency band (FB1), are transmitted as an optical signal having a first wavelength ($\lambda_1$) over the fiber-optic network to the subscribers (T$_i$), the optical signal being amplified by the fiber-optic amplifiers (10, 11), characterized in that means are provided for transmitting subscriber-assigned information signals, such as telephone signals, converted to a second frequency band (FB2) with subscriber-assigned frequencies, as an optical signal having the first wavelength ($\lambda_1$) from the center to the subscribers, the optical signal being amplified in the fiber-optic amplifiers (10, 11);

means are provided for transmitting subscriber-assigned information signals, such as telephone signals, converted to a third frequency band (FB3) with subscriber-assigned frequencies, as an optical signal having a second wavelength ($\lambda_2$) from the subscribers over the same fiber-optic network to the center;

at least one means (40, 41, 43; 51, 54, 52) are provided in the multistar fiber-optic network for extracting said optical signal having the second wavelength ($\lambda_2$) from the optical waveguide (LA4), amplifying it, and reinjecting it into the optical waveguide (LA4); and the means (51, 53, 54, 52) for extracting the optical signal having the second wavelength ($\lambda_2$) to be transmitted to the center from the optical waveguide (LA4), amplifying it, and reinjecting it into the optical waveguide (LA4) are a wavelength-selective pump coupler (51) associated with the fiber-optic amplifier (10), an optical-to-electric transducer (54), and the pump source (52) associated with the fiber-optic amplifier (10), and said means are interconnected so that the optical signal having the second wavelength ($\lambda_2$) to be amplified and transmitted to the center is fed from one port of the pump coupler (51) to an input of the optical-to-electric transducer (54), and an electric output signal of said optical-to-electric transducer (54) modulates the pump light generated by the pump source (52).

20. Fiber-optic communications systems with a center (1) and a plurality of subscribers (T$_i$) wherein the subscribers are connected to the center (1) via a multistat fiber-optic network (LA$_i$, LB$_i$, LC$_j$), wherein fiber-optic amplifiers (10, 11) are provided between successive branch points of the fiber-optic network, and wherein the information signals, particularly television signals, to be distributed by the center (1) to the subscribers (T$_i$), after being converted to a first frequency band (FB1), are transmitted as an optical signal having a first wavelength ($\lambda_1$) over the fiber-optic network to the subscribers (T$_i$), the optical signal being amplified by the fiber-optic amplifiers (10, 11), characterized in that means are provided for transmitting subscriber-assigned information signals, particularly telephone signals, converted to a second frequency band (FB2) with subscriber-assigned frequencies, as an optical signal having the first wavelength ($\lambda_1$) from the center to the subscribers, the optical signal being amplified in the fiber-optic amplifiers (10, 11);

means are provided for transmitting subscriber-assigned information signals, particularly telephone signals, converted to a third frequency band (FB3) with subscriber-assigned frequencies, as an optical signal having a second wavelength ($\lambda_2$) from the subscribers over the same fiber-optic network to the center;

at least one means (40, 41, 43; 51, 54, 52) is provided in the multistar fiber-optic network for extracting said optical signal having the second wavelength ($\lambda_2$) from the optical waveguide (LA4), amplifying it, and reinjecting it into the optical waveguide (LA4); and the means (51, 53, 54, 56, 58, 59) for extracting the optical signal having the second wavelength ($\lambda 2$) to be transmitted to the center from the optical waveguide (LA$_4$), amplifying it, and reinjecting it into the optical waveguide are a wavelength-selective pump coupler (51) associated with the fiber-optic amplifier (10), an optical-to-electric transducer (54), and an electric-to-optical transducer (56), and a wavelength-selective fiber-optic coupler (59) which couples an optical output signal of the electric-to-optical transducer (56) into the optical waveguide (LA$_4$).

* * * * *

UNITED STATES PATENT AND TRADEMARK OFFICE
CERTIFICATE OF CORRECTION

PATENT NO. : 5,337,175
DATED : August 9, 1994
INVENTOR(S) : Ohnsorge et al

It is certified that error appears in the above-indentified patent and that said Letters Patent is hereby corrected as shown below:

At column 14, line 42 (claim 1, line 6), please change "multistat" to --multistar--; and at line 66 (claim 1, line 30), please change "multistat" to --multistar--.

At column 15, line 2 (claim 1, line 34), please change "reinjetting" to --reinjecting--;

at line 6 (claim 2, line 2), please change "multistat" to --multistar--; and at line 57 (claim 8, line 8), please change "$(T_j)$" to --$(T_j)$--.

Signed and Sealed this

Twenty-fifth Day of April, 1995

Attest:

BRUCE LEHMAN

*Attesting Officer*  *Commissioner of Patents and Trademarks*